US007064883B2

(12) United States Patent
Payne et al.

(10) Patent No.: US 7,064,883 B2
(45) Date of Patent: Jun. 20, 2006

(54) TWO DIMENSIONAL SPATIAL LIGHT MODULATOR

(75) Inventors: Alexander P. Payne, Ben Lomond, CA (US); Jahja I. Trisnadi, Cupertino, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 0 days.

(21) Appl. No.: 11/001,364

(22) Filed: Nov. 30, 2004

(65) Prior Publication Data

US 2005/0237743 A1  Oct. 27, 2005

Related U.S. Application Data

(60) Provisional application No. 60/528,300, filed on Dec. 10, 2003.

(51) Int. Cl.
*G02B 26/00* (2006.01)
(52) U.S. Cl. .................... 359/290; 359/291; 359/295
(58) Field of Classification Search ................ 359/290, 359/291, 295, 569, 572, 573, 245, 292, 298, 359/302, 303, 316, 318, 197, 201, 202, 212, 359/223, 224, 566, 559, 576, 578, 584, 585; 385/19, 37, 140, 90
See application file for complete search history.

(56) References Cited

U.S. PATENT DOCUMENTS 6,072,620 A * 6/2000 Shiono et al. .............. 359/290
6,215,579 B1   4/2001 Bloom et al.
6,268,948 B1 * 7/2001 Gelbart ...................... 359/231
2005/0068609 A1 * 3/2005 Trisnadi et al. ............. 359/291
2005/0174628 A1 * 8/2005 Kelly et al. ................. 359/321
2005/0243403 A1 * 11/2005 Yun .......................... 359/291

OTHER PUBLICATIONS

D.T. Amm, et al. "Grating Light Valve Technology: Update and Novel Applications" May 19, 1998, pp. 1-4, Silicon Light Machines. Presented at Society for Information Display Symposium, Anaheim, CA.

(Continued)

*Primary Examiner*—Hung Dang
*Assistant Examiner*—Tuyen Tra
(74) *Attorney, Agent, or Firm*—Okamoto & Benedicto LLP

(57) ABSTRACT

A spatial light modulator is provided having a two-dimensional (2D), close-packed MEMS (Micro-Electromechanical System) array of diffractive pixels. Each pixel includes a number of diffractive elements or diffractors. Each diffractor includes a tent member disposed above and spaced apart from an upper surface of a substrate, a movable actuator disposed between the substrate and the tent member, and a driver moving the actuator. The tent member has a first planar light reflective surface facing away from the substrate, the first planar light reflective surface having an aperture formed therein. The actuator has a second planar light reflective surface parallel to and potentially coplanar with the first planar light reflective surface and positioned relative to the aperture to receive light passing therethrough. The aperture may be sized and shaped to define an area with reflectivity substantially equal to the reflectivity of an area of the first planar light reflective surface surrounding the aperture to provide a maximum contrast ratio.

23 Claims, 11 Drawing Sheets

OTHER PUBLICATIONS

David T. Amm, et al. "Optical Performance of the Grating Light Valve Technology" 1999, pp. 1-8, Silicon Light Machines. Presented at Photonics West-Electronics Imaging.

R.W. Corrigan, "An Alternative Architecture for High Performance Display" Nov. 20, 1999, pp. 1-5; Silicon Light Machines. Presented at SMPTE Technical Conference and Exhibition, New York, NY.

R.W. Corrigan, et al. "Calibration of a Scanned Linear Grating Light Valve Projection System" May 18, 1999, pp. 1-4, Silicon Light Machines. Presented at Society for Information Display Symposium, San Jose, CA.

Robert Corrigan, et al. "Silicon Light Machines—Grating Light Valve Technology Brief", Jun. 2001 ver C. pp. 1-8; Sunnyvale, California.

* cited by examiner

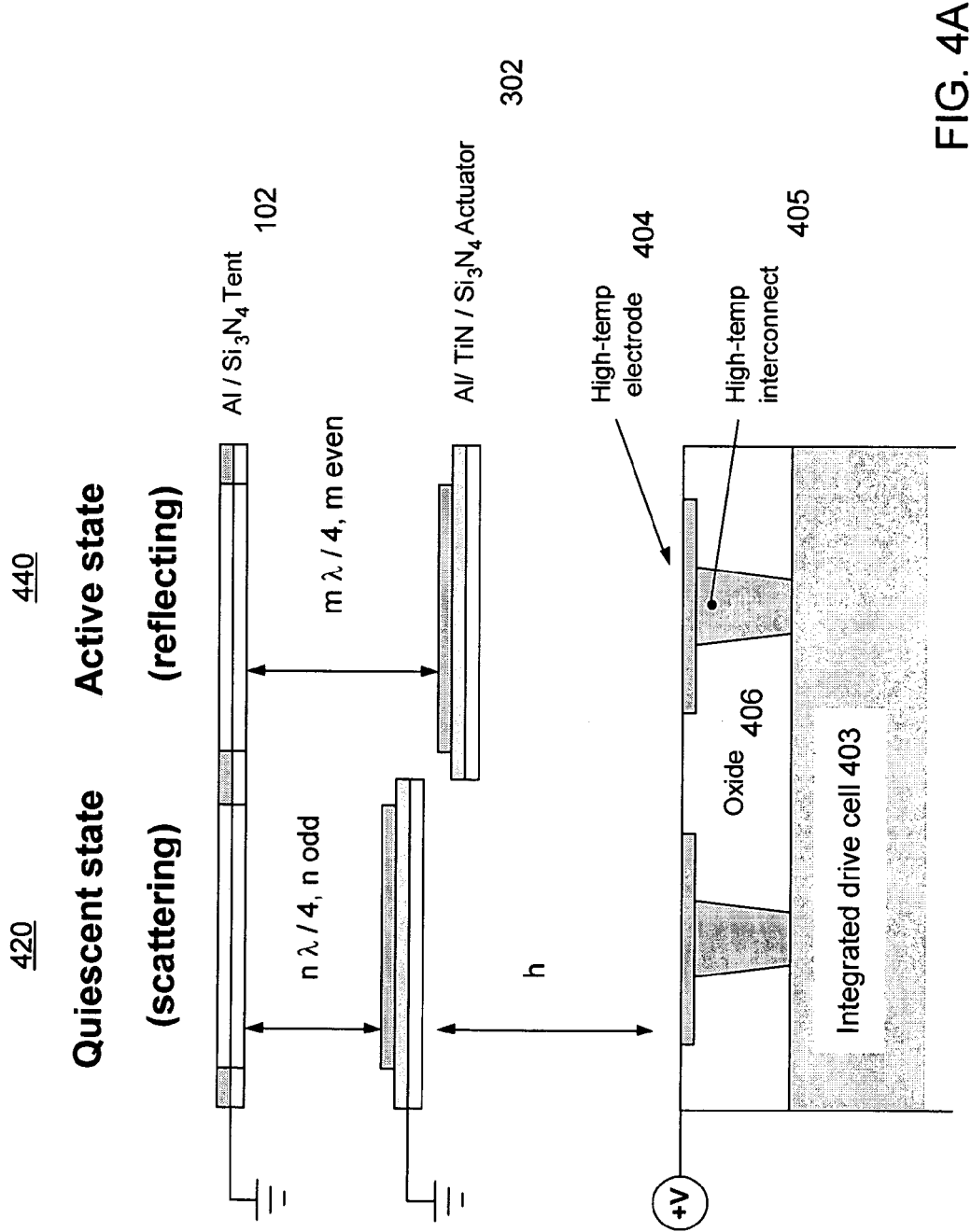

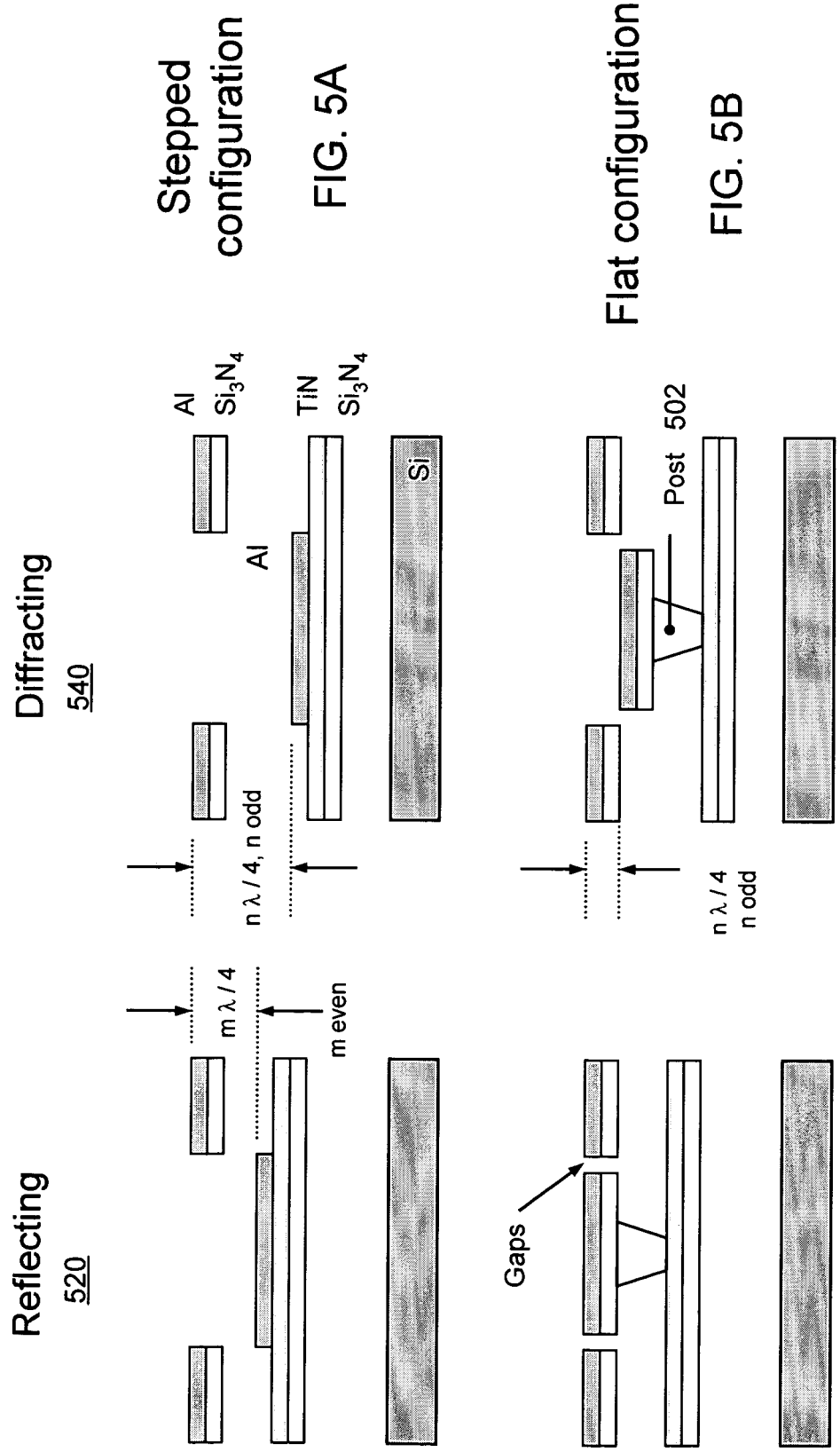

600

FIG. 8A 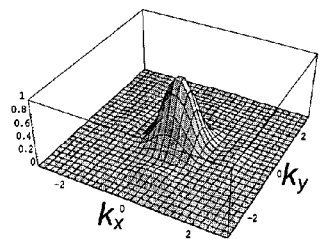 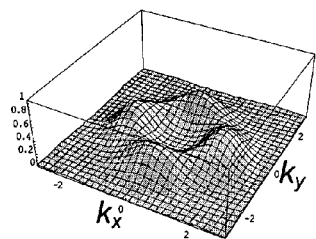 FIG. 8D
FIG. 8B 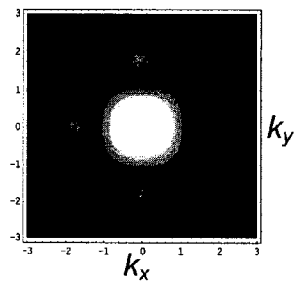 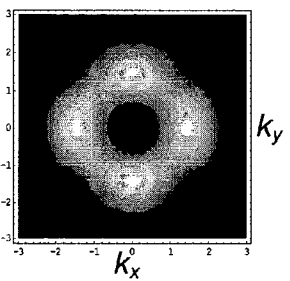 FIG. 8E
FIG. 8C 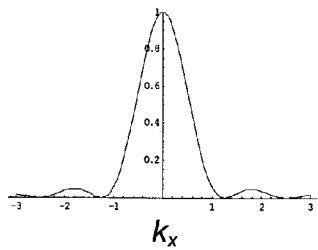 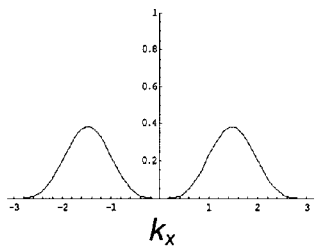 FIG. 8F FIG. 9A
FIG. 9B
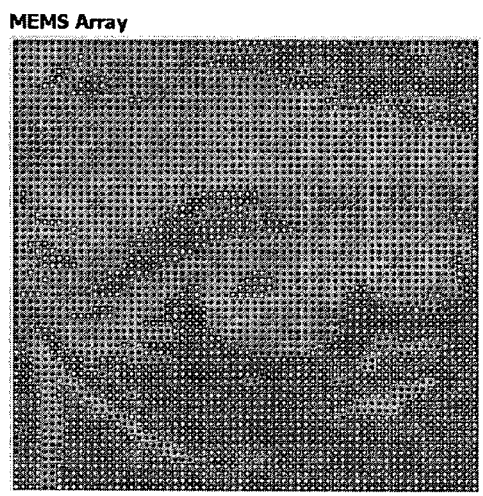
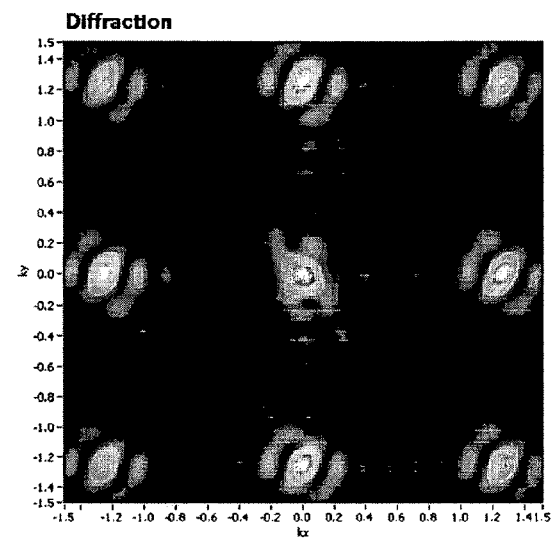
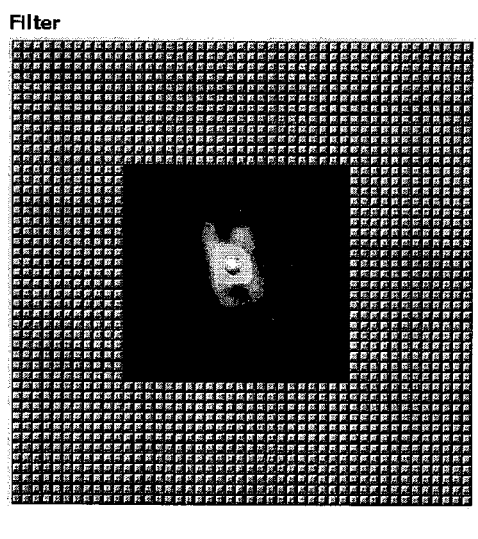
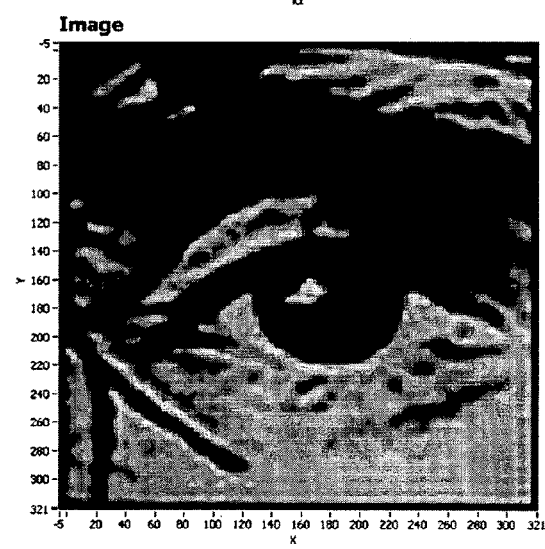
FIG. 9C
FIG. 9D

TWO DIMENSIONAL SPATIAL LIGHT MODULATOR

CROSS-REFERENCE TO RELATED APPLICATIONS

The present application claims the benefit of U.S. provisional application No. 60/528,300, entitled "Two Dimensional Spatial Light Modulator," filed Dec. 10, 2003, by inventors Alexander P. Payne and Jahja I. Trisnadi, the disclosure of which is hereby incorporated by reference.

TECHNICAL FIELD

The present invention relates generally to spatial light modulators, and more particularly to two dimensional diffractive spatial light modulators and methods of manufacturing and using the same.

BACKGROUND OF THE INVENTION

Spatial light modulators are arrays of one or more devices that can control or modulate an incident beam of light in a spatial pattern that corresponds to an electrical input to the devices. The incident light beam can be modulated in intensity, phase, polarization or direction. Some modulation can be accomplished through the use of Micro-Electromechanical System devices or MEMs that use electrical signals to move micromechanical structures to modulate light incident thereon. Spatial light modulators are increasingly being developed for use in various applications, including display systems, optical information processing and data storage, printing, and maskless lithography.

A class of spatial light modulators include a single MEMS device or a linear array of MEMS devices configured to paint two-dimensional patterns. For many applications, such as printed-circuit board (PCB) patterning/printing, display systems, printing and/or relatively moderate range semiconductor processing, spatial light modulators such a one-dimensional MEMS device provides a suitable solution.

However, for many other applications requiring high or very high resolution, such as leading edge semiconductor processing, spatial light modulators having a two-dimensional array of MEMS devices would be preferred.

The appeal of 2D MEMS spatial light modulators has been evidenced in the widespread adoption of the Digital Mirror Device (DMD) from Texas Instruments. With its large étendue, this device can be used with incoherent lamp sources and conventional optics to create high-quality images. Despite its success in display applications, however, the DMD has not been embraced for many applications, for example mask-less lithography. This is primarily due to shortcomings in (a) analog gray-scale capability, (b) modulation speed, and (c) diffraction efficiency.

Accordingly, there is a need for a two dimensional spatial light modulator that exhibits the following characteristics: a large étendue, good analog gray-scale capability, high modulation speed, and high diffraction efficiency. There is a further need for a method of manufacturing such a spatial light modulator that is simple, cost-effective, and tolerant of process variations.

SUMMARY OF THE INVENTION

The present invention provides a solution to these and other problems, and offers further advantages over conventional spatial light modulators.

In one aspect, the present invention is directed to a diffractor for modulating light incident thereon. Generally, the diffractor includes a tent member disposed above an upper surface of a substrate and spaced apart in relation thereto, a movable actuator disposed between the upper surface of the substrate and the tent member, and a mechanism for moving the actuator. The tent member has a first planar light reflective surface formed on an upper side of the tent member (the side facing away from the substrate), the first planar light reflective surface having an aperture formed therein. The actuator has a second planar light reflective surface parallel to the first planar light reflective surface and positioned relative to the aperture to receive light passing therethrough. The aperture can be shaped to define any one of a number of geometric figures including circles, rings, ellipses, and polygons. Preferably, the aperture is sized and shaped to define an area with reflectivity substantially equal to the reflectivity of an area of the first planar light reflective surface surrounding the aperture. If the reflectivity for each surface is the same, then the aperture is sized and shaped to define an area substantially equal to the area of the first planar light reflective surface surrounding the aperture.

The mechanism for moving the actuator is adapted to displace the actuator relative to a first planar light reflective surface of the tent member while maintaining the second planar light reflective surface of the movable actuator substantially parallel to the first planar light reflective surface.

In one embodiment, the diffractor is adapted such that in a quiescent state the first planar light reflective surface and the second planar light reflective surface are separated by a distance substantially equal to $n*\lambda/4$ wavelength, where $\lambda$ is a particular wavelength of light incident on the first and second planar light reflective surfaces, and n is an integer equal to or greater than 0. In one version of this embodiment, n is an odd number equal to or greater than 1, to scatter light incident on the reflector in the quiescent state. In another version, n is an even number equal to or greater than 2, to reflect light incident on the reflector in the quiescent state.

In another embodiment, the tent member is supported above the upper surface of the substrate by a number of posts extending from the upper surface of the substrate to a lower surface of the tent member. In one version of this embodiment, at least one of the posts is electrically coupled to an electrical ground in the substrate, and the tent member is electrically coupled to the electrical ground through the post. In another version the actuator is flexibly coupled between the upper surface of the substrate and the tent member by at least one flexure extending from a peripheral edge of the movable actuator to at least one of the posts, and the actuator is electrically coupled to ground through the flexure and the post.

In yet another embodiment, the movable actuator includes an upper portion on which the second planar light reflective surface is formed, a lower portion and a support coupling the upper and lower portions. Preferably, the upper portion and the support are sized and shaped relative to the aperture to enable the actuator to be moved between a first position where the second planar light reflective surface is co-planar with the first planar light reflective surface and a second position where the second planar light reflective surface is parallel to but not co-planar with the first planar light reflective surface. An advantage of this embodiment in first-order imaging systems is that it provides a "dark" reflecting state for polychromatic or multi-wavelength light sources.

In another aspect the invention is directed to a spatial light modulator including a number of the diffractors described above. Generally, the modulator includes a number of pixels, each pixel having at least one diffractor. In one embodiment, the diffractors are integrally formed on a single substrate with the tent members of each of the diffractors are formed from a single tent membrane supported above the upper surface of the substrate by a number of posts extending from the upper surface of the substrate to a lower surface of the tent membrane. In another embodiment, the actuators of each of the diffractors are flexibly coupled between the upper surface of the substrate and the membrane by at least one flexure extending from a peripheral edge of at least one actuator to at least one of the posts, and each of the actuators is coupled to at least one other actuator along the peripheral edges thereof.

In yet another aspect the invention is directed to a method of modulating a beam of light. Generally, the method includes the steps of: (i) causing the beam of light to impinge upon a number of diffractors, each including a first planar light reflective surface having an aperture formed therein, and a second planar light reflective surface parallel to the first planar light reflective surface and positioned relative to the aperture to receive light passing therethrough; and (ii) moving the second planar light reflective surface relative to the first planar light reflective surface while maintaining the second planar light reflective surface substantially parallel to the first planar light reflective surface to diffract the beam of light as it is reflected from the first and second light reflective surfaces of each of the of diffractors.

In still another aspect the invention is directed to a method of manufacturing a modulator for modulating a beam of light. Generally, the method involves: (i) providing an electrically active substrate containing circuitry for driving each pixel of the modulator; (ii) depositing a first sacrificial layer onto the substrate; (iii) forming a number of holes extending through the first sacrificial layer and terminating onto the substrate; (iv) depositing an actuator layer onto the first sacrificial layer so that the material of the actuator layer substantially fills the holes to form a number of first posts; (v) patterning the actuator layer to form a number of actuators and a number of flexures coupling the actuators to the first posts; (vi) depositing a second sacrificial layer onto the patterned actuator layer; forming a number of second holes extending through the second sacrificial layer, each of the second holes located in the second sacrificial layer to align with and terminate onto one of the first posts; (viii) depositing a tent layer onto the second sacrificial layer so that the material of the tent layer substantially fills the second holes to form a number of second posts; (ix) patterning the tent layer to form a tent member having a number of apertures therein, each of the apertures located in the tent member to align with one of the actuators; and (x) removing the first and second sacrificial layers to release the actuators and the flexures.

In one embodiment, the method further includes the further step of depositing a metal over the modulator to provide a first reflective surface on the tent member and a second reflective surface on each of the actuators. Preferably, in the depositing step the tent member functions as a shadow mask to enable the metal to be deposited on the actuator substantially without depositing metal on the flexures. More preferably, the second reflective surface on each of the actuators is parallel to the first planar light reflective surface and positioned relative to one of the apertures to receive light passing therethrough.

BRIEF DESCRIPTION OF THE DRAWINGS

These and various other features and advantages of the present invention will be apparent upon reading of the following detailed description in conjunction with the accompanying drawings and the appended claims provided below, where:

FIG. 4A is a schematic sectional side view of two adjacent diffractors of a PLV with a scattering quiescent state according to an embodiment of the present invention;

FIG. 5A is schematic sectional side views of a diffractor of the PLV of FIG. 1 in both a reflecting and diffracting state;

FIG. 5B is schematic sectional side view of a diffractor of a PLV according to yet another embodiment of the present invention in both a reflecting and diffracting state;

FIGS. 8A–8C are surface contours, gray-scales, and cross-sections of the scattered intensity distribution of light scattered from a single diffractor according an embodiment of the present invention in the reflecting state;

FIGS. 8D–8F are surface contours, gray-scales, and cross-sections of the scattered intensity distribution of light scattered from a single diffractor according an embodiment of the present invention in the scattering state; and FIGS. 9A–9D illustrate a simulation of the imaging performance of a PLV according an embodiment of the present invention.

DETAILED DESCRIPTION

The present invention is directed to a novel spatial light modulator (SLM) hereinafter referred to as a Planar Light Valve (PLV) and a method of modulating light incident thereon.

A PLV according to the present invention will now be described with reference to FIGS. 1 through 4. For purposes of clarity, many of the details of SLMs that are widely known and are not relevant to the present invention have been omitted from the following description.

Figure 1:
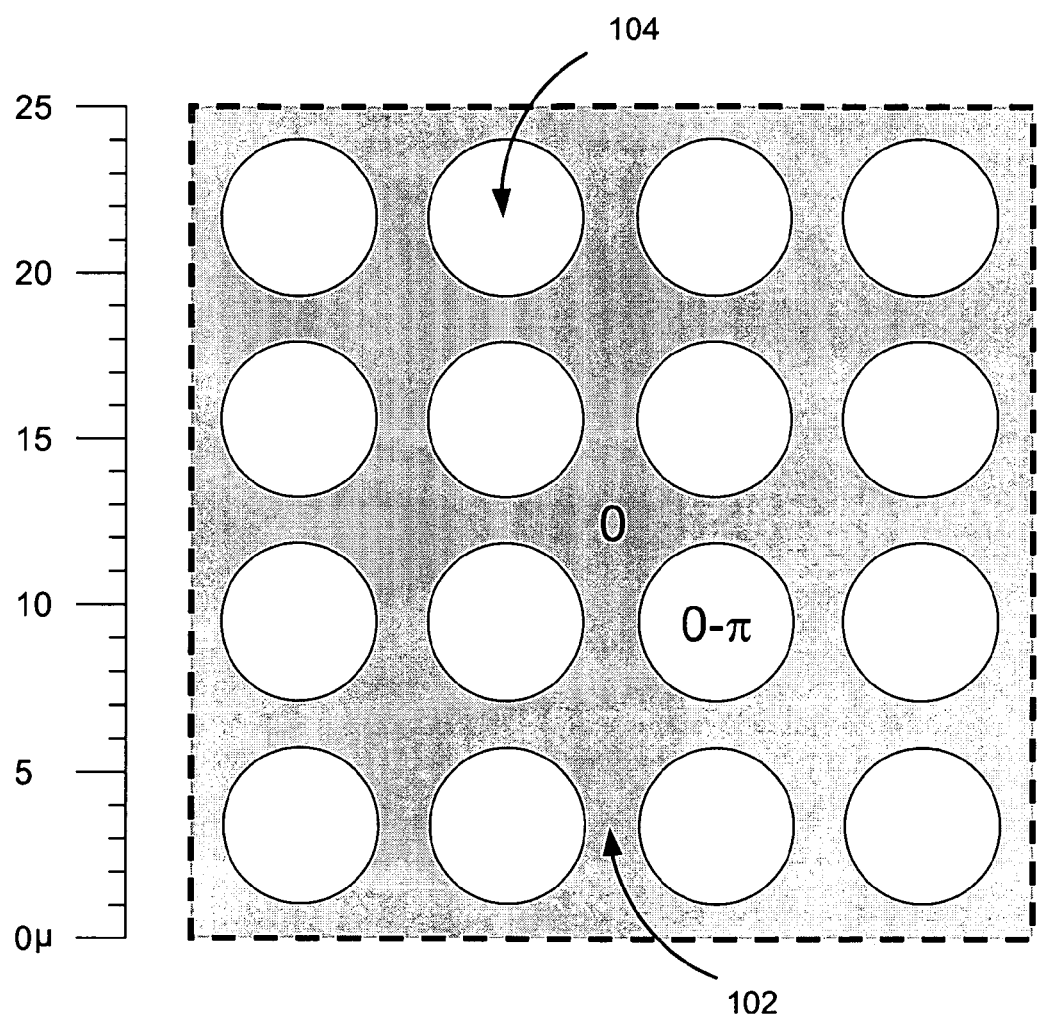
FIG. 1 is a top view of a Planar Light Valve (PLV) according to an embodiment of the present invention.

FIG. 1 is a plan view of a portion of a PLV according to an embodiment of the present invention. The PLV generally has two films or membranes having light reflecting surfaces of equal area and reflectivity disposed above the upper surface of a substrate (not shown in this figure). The topmost film is a static tent member or membrane of a uniform, planar sheet of a material having a first planar light reflective surface, for example taut silicon-nitride covered on at least one aluminized surface. The tent membrane 102 has an array of apertures 104 extending from the reflective surface to a lower surface. The tent membrane 102 covers an actuator membrane underneath. The actuator membrane includes a number of flat, displaceable or movable actuators. The actuators have second planar light reflective surfaces parallel to the first planar light reflective surface and positioned relative to the apertures 104 to receive light passing therethrough. Each of the actuators, the associated apertures and a portion of the tent membrane 102 immediately adjacent to and enclosing the aperture form a single, individual PLV cell, diffractor cell or diffractor.

Individual actuators or groups of actuators are moved up or down over a very small distance (typically only a fraction of the wavelength of light) relative to first planar light reflective by electrostatic forces controlled by drive electrodes in the substrate underlying the actuator membrane. Preferably, the actuators can be displaced by n*λ/4 wavelength, where λ is a particular wavelength of light incident on the first and second planar light reflective surfaces, and n is an integer equal to or greater than 0. Moving the actuators brings reflected light from the second planar light reflective surface into constructive or destructive interference with light reflected by the first planar light reflective surface, thereby modulating light incident on the PLV.

The PLV include any number of diffractors arranged and operated to form pixels of any configuration or size. A pixel is made up of one or several actuators and operating under the same (ganged) electrode. Generally, the PLV will include an array of from about 1 to about $10^8$ pixels, and from 1 to about 25 diffractors per pixel. The embodiment in FIG. 1 shows a single pixel configured as a square 4×4 array of diffractors. However it will be apparent to those skilled in the art that the PLV can include a number of pixels having any number diffractors arranged in any configuration including square, triangular, hexagonal and circular.

Figure 2D:
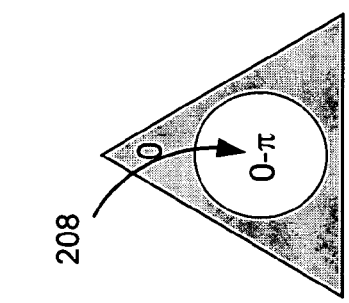
FIGS. 2A–2G are top schematic views of a single diffractor having alternative apertures according another embodiment of the present invention.
Figure 2C:
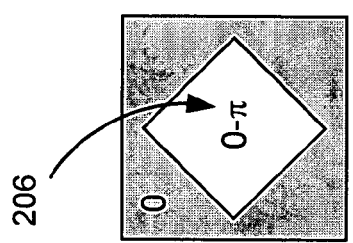
Figure 2B:
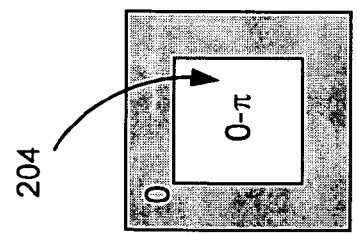
Figure 2A:
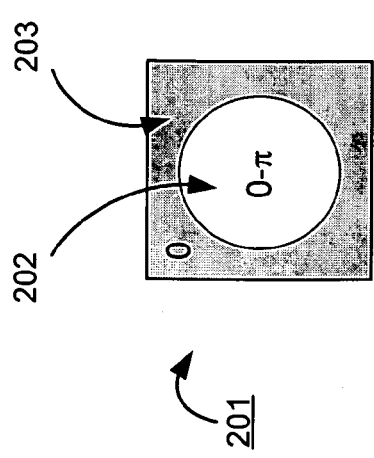
Figure 2G:
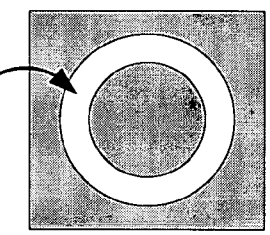
Figure 2F:
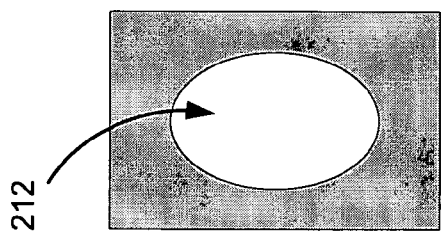
Figure 2E:
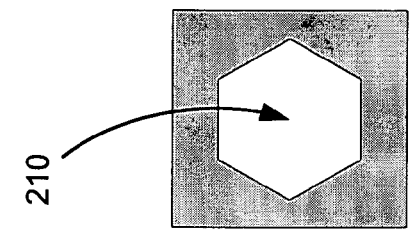

The size and position of each of the apertures 104 are predetermined to satisfy the "equal reflectivity" constraint. That is the reflectivity of the area of a single aperture 104 inside a cell of the tent membrane 102 is equal to the reflectivity of the remaining area of the cell that is outside the aperture 104. If the reflectivity of each of the surfaces is the same, then this principle reduces to an "equal area" constraint. As an example of the "equal area" constraint, where the tent contains an array of circular apertures 202 in square-shaped cells 201, as shown in FIGS. 1 and 2A, the area of a circular aperture 202 inside in a unit length square 201 is equal to the remaining area (outside circle but inside square) 203, when its diameter, d, is given by the equation: $d = \sqrt{2/\pi} \approx 0.8$ unit length.

While circular apertures (for example, 202 and 208) are uniquely suited to the biaxial stress state of a tensile film, other aperture shapes are possible including rings (for example, 214), ellipses (for example, 212), and polygons (for example, 204, 206, 210), as shown in FIGS. 2A–2G. The cell may be square-shaped as in FIGS. 2A, 2B, 2C, 2E, and 2G, or it may be other shapes, such as triangles (for example, see FIG. 2D) or rectangles (see FIG. 2F). Only the equal reflectivity principle (or the equal area principle if the surface reflectivities are the same) needs be satisfied for these to work well as high-contrast phase modulators. (Note that FIGS. 2A through 2G are illustrative and are not necessarily to scale. For example, the ring 214 in FIG. 2G does not appear to satisfy the equal area principle as drawn, but an actual implementation would be configured to satisfy the equal area principle in accordance with an embodiment of the invention.) The absence of corners in the circular aperture assures no stress concentrations or warping of the film near the perimeter of the aperture. Similarly, while other array geometries are conceivable (i.e. hexagonal grid), the square grid is best suited to the data format of digital images.

The tent membrane 102 could be either static, anchored or secured to the substrate by a number of posts regularly spaced across the PLV, or freestanding and actuatable, flexibly secured to posts only at a perimeter of the PLV. In a preferred embodiment, the tent membrane 102 is periodically secured to the underlying substrate by posts across the PLV, for example at each corner of each pixel. More preferably, the tent membrane 102 includes an electrically conductive material, such as titanium-nitride (TiN), and is electrically coupled to a ground in the substrate through one or more of the posts. Alternatively, if the tent membrane 102 were deforming under electrostatic force from actuator drive electrodes in the substrate, it could be electrically floated to eliminate this interaction.

Figure 3A:
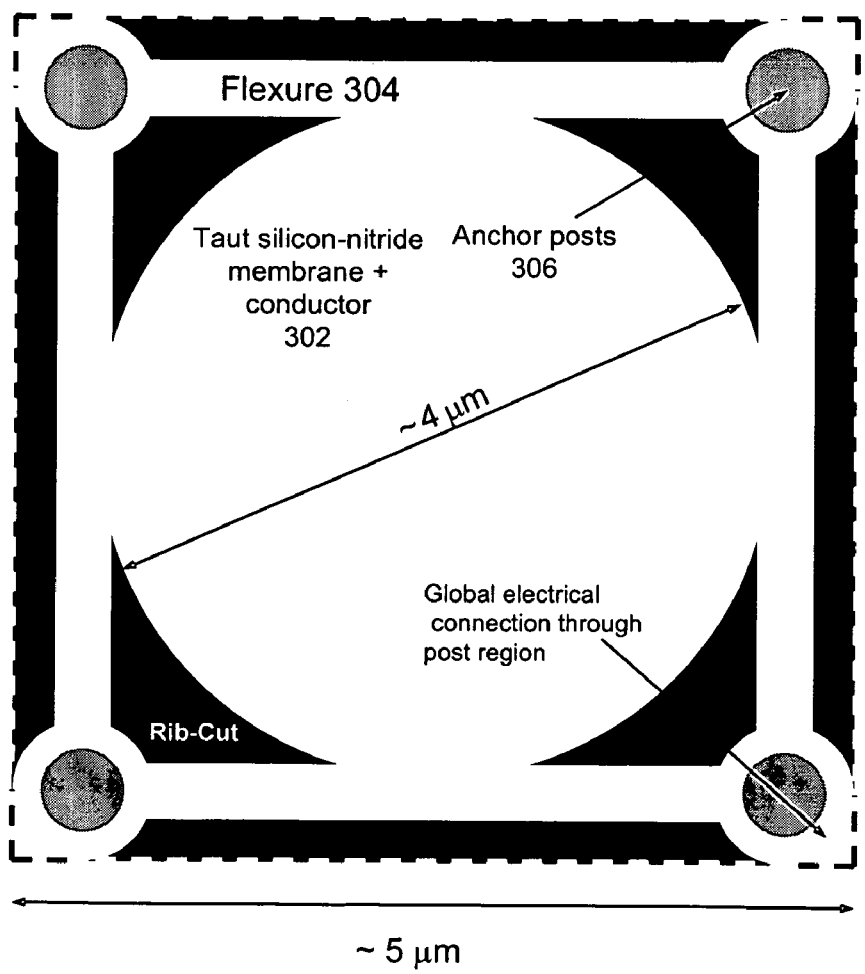
FIG. 3A is a schematic block diagram of a single actuator according to an embodiment of the present invention.
Figure 3B:
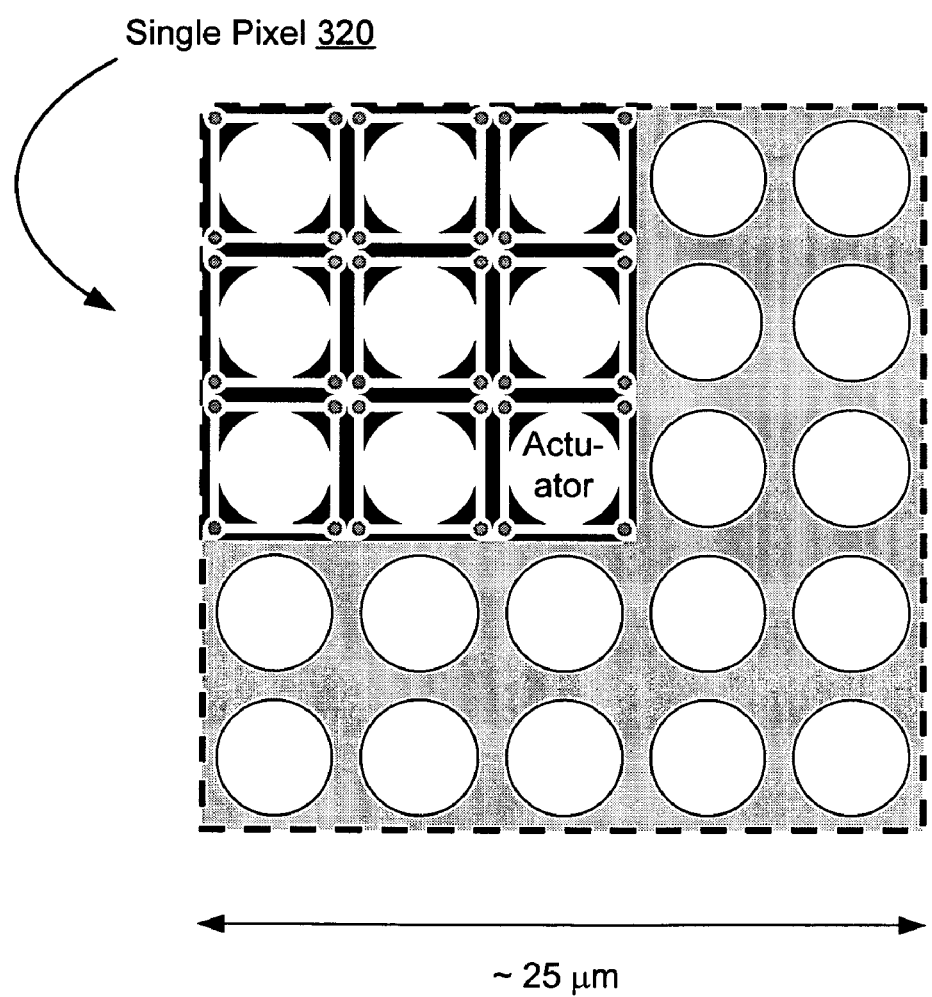
FIG. 3B is a partial top view of a portion of a PLV showing a cut away view of the actuator layer according to an embodiment of the present invention.

The underlying structures of the PLV, such as the actuator membrane, will now be described in greater detail with reference to FIGS. 3A and 3B. It is to be understood that the embodiment shown in FIGS. 3A and 3B, and the specific dimensions given therein, are exemplary only, and the PLV of the present invention is not limited to the embodiment and dimension shown. FIG. 3A is a close up of a single actuator 300 according to an embodiment of the present invention. FIG. 3B shows a cut away view of a portion of the actuator membrane including a single 3×3 pixel 320. In this embodiment, the actuator membrane is anchored or posted to the underlying substrate at the corner of each actuator. The tent membrane 102 is sparsely or lightly posted to the substrate at the extremities of the illustrated array.

Referring to FIG. 3A, the actuators 300 may include uniform, planar disks 302 each having a planar reflective surface and flexibly coupled by hinges or flexures 304 of an elastic material to one or more posts 306. For example, the planar disks 302 of the actuators 300 may comprise aluminized disks formed from a taut silicon-nitride film, and flexibly coupled to the posts 306 by narrow, non-aluminized flexures 304 of the same silicon-nitride film. Anchoring posts 306 and flexures 304 may be hidden in the area concealed by the overlying tent membrane 102, thereby providing the inventive PLV a large étendue (light gathering power) and substantially 100% diffraction efficiency. Referring to FIG. 4, the actuator membrane, and the actuators formed therein, also includes, in addition to the aluminum layer and the silicon-nitride (SiN) layer, an electrically conductive film or layer (i.e., titanium-nitride TiN). The conductive layer is electrically coupled to electrical ground in the substrate through one or more of the posts (not shown in this figure), such that a voltage applied to the drive electrode through an integrated drive cell or channel in the substrate deflects actuators toward or away from the substrate. Generally, a single conductor from the drive channel branches into mini-electrodes or drive-electrodes underneath each individual actuator in a single pixel.

Figure 4B:
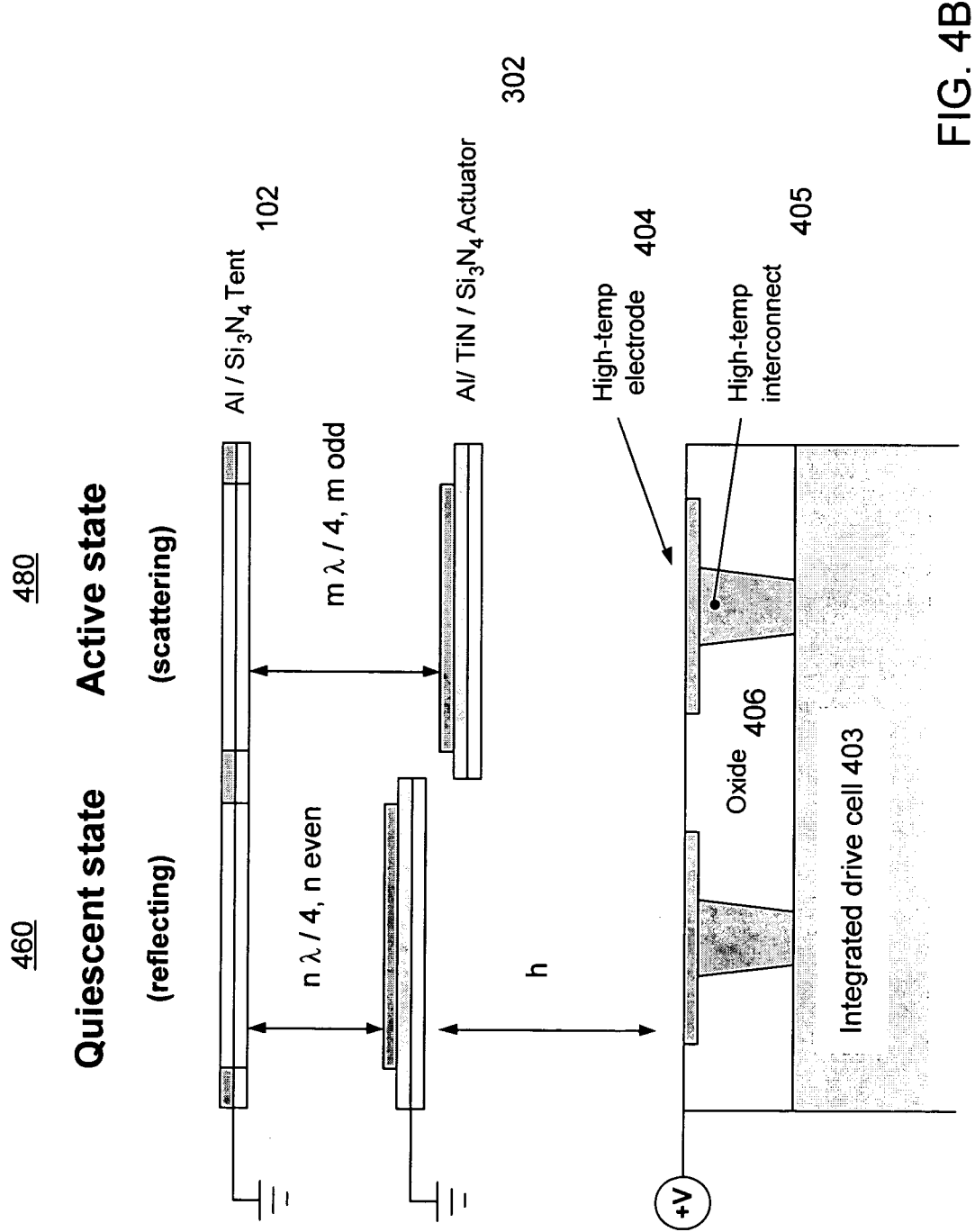
FIG. 4B is a schematic sectional side view of two adjacent diffractors of a PLV with a reflecting quiescent state according to an embodiment of the present invention.

FIGS. 4A and 4B each depict a cross-section through two adjacent diffractors of a PLV device. In these example embodiments, the upper tent membrane 102 remains static, while the lower actuator membrane 302 or actuators move under electrostatic forces from integrated electronics or circuitry in the substrate 402.

The integrated electronics or circuitry 402 may include an integrated drive cell 403 coupled to high-temperature electrodes 404 via high-temperature interconnect 405. Oxide 406 may be used to electrically isolate the electrodes 404. The circuitry 402 is configured so as to be able to controllably create an electrostatic force between each electrode 404 and its corresponding actuator 302.

Imaging modes allow the flexibility to mix-and-match imaging mode ($0^{th}$ or $1^{st}$) and device quiescent state (scattering or reflecting). This design allows some flexibility in the mode of use of operation.

For example, in manufacturing the device shown in FIG. 4A, described infra, thickness of an upper sacrificial layer (which during manufacturing is between the tent 102 and actuator 302 layers) may be chosen such that, in the actuator's quiescent state 420, the tent membrane 102, or more accurately the first reflective surface, and the actuator 302, or the second reflective surface, are displaced from one another by an odd multiple of $\lambda/4$, for a particular wavelength $\lambda$ of light incident on the PLV. This causes the device in the quiescent state 420 to scatter incident light, as illustrated by the left actuator of FIG. 4A. In an active state 440 for the device, as illustrated by the right actuator of FIG. 4A, the actuator 302 may be displaced such that the distance between the reflective surfaces of the tent membrane 102 and the actuator 302 is an even multiple of $\lambda/4$. This causes the device in the active state 440 to reflect incident light. In conjunction with $0^{th}$ order imaging, the quiescent (unactivated) state 420 would correspond to the PLV $0^{th}$-order dark state (due to diffraction of the incident light), and active state 440 would correspond to the PLV $0^{th}$-order bright state (due to reflection of the incident light). In conjunction with $1^{st}$ order imaging, the quiescent (unactivated) state 420 would correspond to the PLV $1^{st}$-order bright state (due to the $1^{st}$-order diffraction of the incident light), and active state 440 would correspond to the PLV $1^{st}$-order dark state (due to reflection of the incident light away from the $1^{st}$-order diffraction).

An alternative embodiment, shown in FIG. 4B, the thickness of an upper sacrificial layer may be chosen such that, in the actuator's quiescent state 460, the tent membrane 102 (first reflective surface) and actuator 302 (second reflective surface), are displaced from one another by an even multiple of $\lambda/4$, for a particular wavelength $\lambda$ of light incident on the PLV. As such, the quiescent state 460 becomes reflecting. In an active state 480 for the device, as illustrated by the right actuator of FIG. 4B, the actuator 302 may be displaced such that the gap between the reflective surfaces of the tent membrane 102 and the actuator 302 is an odd multiple of $\lambda/4$. This causes the device in the active state 480 to scatter incident light. In conjunction with $0^{th}$ order imaging, the quiescent (unactivated) state 460 would correspond to the PLV $0^{th}$-order bright state (due to reflection of the incident light), and active state 480 would correspond to the PLV $0^{th}$-order dark state (due to diffraction of the incident light). In conjunction with $1^{st}$ order imaging, the quiescent (unactivated) state 460 would correspond to the PLV $1^{st}$-order dark state (due to reflection of the incident light away from the $1^{st}$-order diffraction), and active state 480 would correspond to the PLV $1^{st}$-order bright state (due to the $1^{st}$-order diffraction of the incident light).

In order to provide stable operating condition, the distance, h, between the actuator 302 and substrate 402 is larger than 3× the maximum displacement, i.e., $h > 3\lambda/4$, for example preferably h is $5\lambda/4$.

In accordance with an embodiment of the invention, the design of the actuator membrane is carefully engineered such that the actuators 302 remain flat or substantially flat as they are displaced. The following design features may be used to facilitate this feature:

(1) The actuator disks 302 are suspended by narrow flexures 304, which sustain most of the deformation as they assume a parabolic shape under electrostatic deflection.

(2) The actuator disks 302 are connected to the flexure 304 only at their centers, and as far away from the anchor posts as possible. As the actuators deflect, the centers of the flexures remain parallel to the substrate, thereby inducing no tilt or moment on the actuator disk.

(3) The actuator disk 302 is minimally connected to the flexure 304 only at the attachment points. Thus, little deformation is mechanically transmitted from the flexure to the actuator disk.

(4) The reflective aluminum or metal layer is present only on the actuator disk 302 (not on the flexure 304), thereby naturally stiffening the actuator only in the region that requires it.

(5) Optionally, if additional stiffness is required, other high modulus films, such as oxides, could be patterned onto the actuator disk 302 and not on the flexures 304.

Discontinuous & Co-Planar Surfaces

In the embodiments of the PLV described above, the PLV is a stepped PLV (FIG. 5A) in which the reflecting state 520 is achieved with two discrete surfaces, related in phase by an even multiple of $\lambda/4$. In a 1st order imaging system, this reflecting state would be the dark state. Note that this is "dark" only for a single wavelength corresponding to $\lambda$. This may not be suitable for polychromatic (multi-wavelength applications).

An alternative design for the PLV is a Flat PLV, as shown in FIG. 5B. Such a design addresses this issue of suitability for polychromatic applications. Referring to FIGS. 5B, a physical post 502 is used to make the reflecting surfaces truly co-planar in the reflecting state 520. In a first-order imaging system, this state is "dark" for all wavelengths—a significant advantage. For the diffracting state 540, the actuator is deflected such that the difference between the reflective surfaces is an odd multiple of $\lambda/4$. The amount of this deflection would be configured in dependence on the wavelength $\lambda$ being used.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching.

Advantages of a PLV according to the present invention include any or all of the following:

Large étendue—The large area and large diffraction angle of the PLV allow it to be illuminated with high-étendue conventional sources (i.e. lamps). Since diffraction angle and pixel size are independent, larger pixels can be fabricated to increase étendue, with no penalty in optical angle.

No Screen Door—The PLV would generate the same borderless pixels. Pixel frames are an artifact of conventional SLMs, such as Digital Mirror Devices (DMDs), and will continue to exist with the tilt mirror approach.

100% or near 100% diffraction efficiency—The stepped PLV design has 100% or near 100% fill factor (no gaps). This is an advantage over the DMDs, which must include gaps around each tilt mirror for clearance.

$10^3$ contrast ratio—Because the PLV has no gaps, it is has high contrast, even in 0th order operation. Moreover, the contrast is controlled by lithography—inherently a high accuracy process. The PLV actuator must be properly engineered to deflect as a flat plane in order to insure this.

Improved analog gray-scale—The DMDs rely on pulse width modulation to achieve gray scale, limiting it in terms of speed and/or bit-depth. In contrast, the PLV inherently achieves gray scale (by varying the displacement of the actuator). This translates directly into higher data rate for the PLV device.

Large Diffraction angle—The PLV actuators described herein scale to a 5 µm pitch (ribbon+hole). This gives us diffraction angles on the order of ±6°, at visible wavelengths (~0.5 µm) capable of being used with reasonably fast optics (f#~5). With advances in lithographic resolution, smaller diffractors are possible, facilitating even larger diffraction angles.

Narrow diffracted beam—A 25 µm square pixel would be composed of 25 actuators (i.e., a 5×5 array) ganged to a single substrate electrode. This has the advantage of narrowing the diffracted beams ($\Delta\theta$) relative to the diffraction angle ($\theta$). The pay-off is higher contrast.

Low-voltage operation 3–5V operation compatible with CMOS—Because of the relatively large area of the actuator disk relative to the flexures, the actuation voltages of the PLV should be lower than the GLV. Moreover, since the hinge structure is decoupled from the optics of the device (hidden hinges or flexures), the supports or posts can be tailored for low actuation voltage, for example, by narrowing the flexures or implementing engineered flex or attachment points.

Non-contact switching MEMS device—This is a major advantage for any MEMS device. The DMD device is a contact MEMS device that must be painstakingly engineered for reliability.

High modulation speed—Because each actuator is so small, for example 5×5 µm, its mass and resonant frequency are very high. Estimated resonant frequency for the 5 µm actuator described here is T=6 ns (160MHz). In contrast, the DMD takes 24 µs to actuate.

High power handling—Because the foundation of the device, fully-densified silicon-nitride deposited at ~800° C., the device can withstand extremely high photon powers and power and densities.

Figure 6:
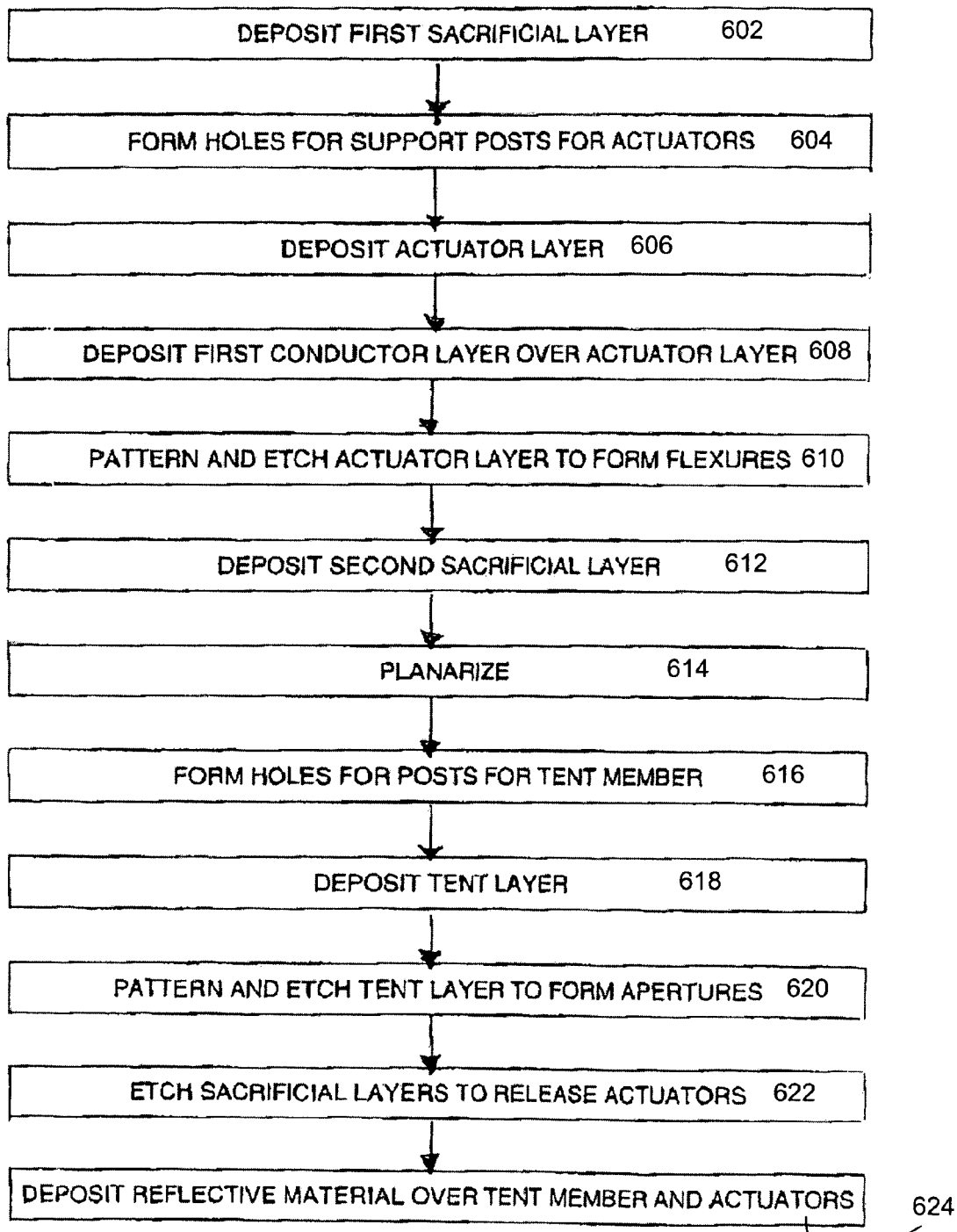
FIG. 6 is a flowchart of a process for fabricating a PLV according to an embodiment of the present invention.

An embodiment of a method or process 600 for fabricating a PLV device of the according to the present invention will now be described with reference to FIG. 6. FIG. 6 is a flowchart illustrating a rough process flow for fabricating the device. The process flow illustrated assumes a 2D (two-dimensional) array of integrated drive cells or electrodes have been formed in the substrate such as a silicon wafer. High-temperature metallization, such as tungsten, W, extends from the integrated drive circuitry to a patterned array or mini-electrodes or drive-electrodes underneath the actuators to be formed. At this point the wafer is planarized or polished to have an optically flat upper surface. The steps below highlight how the PLV device may be built or fabricated on the upper surface of the substrate.

SAC1—A first sacrificial layer is deposited over the upper surface of the substrate (step 602). Generally, the first sacrificial layer includes silicon. Preferably, the sacrificial layer has a thickness of about 5 $\lambda/4$ to provide a sufficient margin against snap down. Alternatively, different design rules might apply to provide a sacrificial layer having a different thickness.

POST1—Holes for support posts for supporting the actuators are formed or drilled into and through the first sacrificial layer and terminate onto an oxide etch stop on the upper surface of the substrate (step 604).

NITRIDE1—An actuator layer is deposited over the first sacrificial layer, filing the postholes to form an actuator membrane and posts. Generally, the actuator layer includes a nitride, such as silicon-nitride (step 606).

METAL1—A conductive layer is deposited on top of the actuator layer (step 608). This conductive film must not be etched by a subsequent XeF2 release, step, so TiN would be preferred. A poly-Silicon (Poly-Si) layer could also be used, although this should be encased in nitride.

RIBCUT1—Cuts are patterned and etched into the actuator layer and conductive layer to form or define a number of actuators and flexures coupling the actuators to the posts (step 610).

SAC2—A second sacrificial layer is then deposited over the patterned actuator layer and conductive layer (step 612). Thickness of the second sacrificial layer is selected relative to a predetermined wavelength of light to have a thickness of a multiple of $\lambda/4$ of the light, depending on the intended mode of operation of the device, i.e., either $0^{th}$ or $1^{st}$ mode of operation.

PLANARIZE—Preferably, because the second sacrificial layer is deposited over a layer with existing topography, i.e., actuator ribbon cuts, it is planarized, for example by chemical-mechanical planarization or polishing (CMP) (step 614).

POST2—Holes for posts to anchor the tent at selected locations are formed extending into and the through the second sacrificial layer (step 616). In one embodiment, the holes are located to terminate on the posts previously formed to support the actuators. Alternatively, the holes can further extend through the first sacrificial layer and terminate onto the oxide etch stop on the upper surface of the substrate.

NITRIDE2—A tent layer is deposited over the second sacrificial layer, filing the postholes to form a tent membrane 102 and posts. Generally, the tent layer includes a nitride, such as silicon-nitride (step 618).

RIBCUT2—A second ribbon-cut performed to define the large apertures or holes in the tent layer (step 620).

RELEASE—An $XeF_2$ release is performed to release the tent membrane 102 and the actuator membrane or actuators (step 622). Large apertures in tent and holes in the actuator layer, defined by the flexures and perimeters of the actuator disks, facilitate etching by allowing the etchant to penetrate into the first sacrificial layer. Because, lateral etch distance is small, release times are short, minimizing unwanted etching of non-silicon structures in the array.

METAL2—A reflective material, such as a low energy aluminum, is deposited over the entire PLV device (step 624). A top surface of the tent membrane 102 is metalized to provide a first reflective surface. In addition, the tent membrane 102, with the apertures formed therein, functions as a shadow mask to enable the reflective material to be deposited on the actuators substantially without depositing metal on the flexures.

Figure 7:
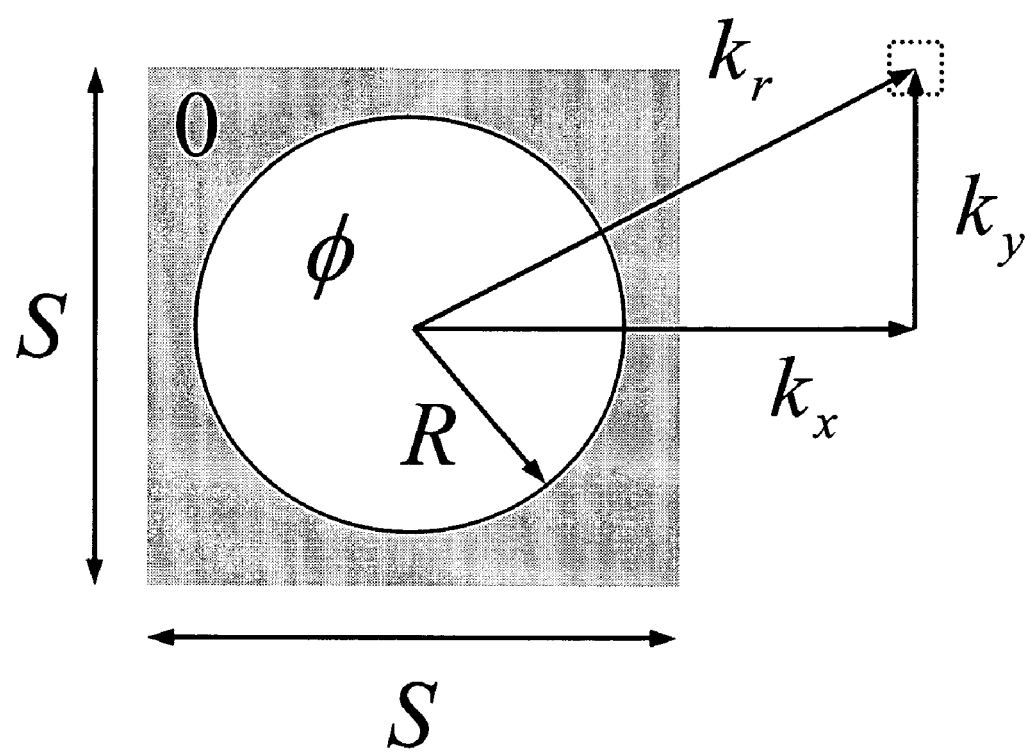
FIG. 7 is a top schematic view of a single diffractor according an embodiment of the present invention showing the intensity and distribution of light scattered therefrom.

The distribution of light scattered from a diffractor of a PLV according to an embodiment of the present invention, and the derivation of an expression describing the distribution of light, will now be described with reference to FIGS. 7 and 8A–7F.

Closed-form analytical expressions describing the distribution of light scattered from the PLV diffraction element can be derived. The geometry for this calculation is shown in FIG. 7. FIG. 7 is a top schematic view of a single PLV diffraction element or diffractor according an embodiment of the present invention showing the intensity and distribution of light scattered therefrom. The scattering element includes of a square area (dimension S, phase 0) and inset circular region (radius R, phase Φ). Radius R is adjusted such that the area inside & outside the circle region is equal. Scattering vectors ($k_x$, $k_y$, where $k=2\pi/\lambda$) are defined relative to the center of the element.

By performing a two-dimensional Fourier transformation of this phase cell the amplitude scattering coefficient of Equation 2 results. The first term is radially symmetric and describes the scattering from the circle. The second term is the scattering from the S×S square. It has 4-fold symmetry.

$$A(k_x, k_y) = S^2 \text{sinc}\left(\frac{k_x S}{2}\right)\text{sinc}\left(\frac{k_y S}{2}\right) + 2\pi(e^{i\varphi} - 1)\int_0^R r\,dr J_0(k_r r)$$

Equation 1: Amplitude Scattering Expression for the PLV Diffractive Element.

With the analytical expression of Equation 1, the intensity of light diffracted from the PLV device can be calculated as a function of the deflection (phase) of the inset circular region. This is shown in FIGS. 8A–8F. Specifically, two limiting cases are of interest: (a) the reflecting state (Φ=0) of constructive interference and (b) the diffracting state of destructive interference (Φ=π). These cases are shown in various ways in FIG. 8A–8F. For each state, three diagrams are shown. The first diagram is a surface plot of scattered intensity. The second diagram is a top-down gray scale image, and the third diagram is a cross-section through $k_x$, $k_y$ origin. In the reflecting state (top row, including FIGS. 8A through 8C), one can clearly see the 4-fold symmetry of the device. This scattering is identical to the diffraction from a square reflective element. The second row (including FIGS. 8D through 8F) shows that in the diffracting state, the back-reflected light ($k_x=0$, $k_y=0$) is reduced to zero, and the scattered intensity assumes a roughly circular distribution. This is the fundamental contrast mechanism of the PLV device.

FIGS. 8A–8C are a surface contour diagram (FIG. 8A), gray-scale diagram (FIG. 8B), and a cross-sectional diagram (FIG. 8C), respectively, of the scattered intensity distribution of light scattered from a single diffractor in the reflecting state. Note that in the reflecting state the device shows maximum back-reflectivity and 4-fold diffraction symmetry.

FIGS. 8D–8F are a surface contour diagram (FIG. 8D), a gray-scale diagram (FIG. 8E), and a cross-sectional diagram (FIG. 8F), respectively, of the scattered intensity distribution of light scattered from a single diffractor in the scattering or diffracting state. In the diffracting state, back-reflected light is extinguished and light is scattered into a roughly circular distribution around normal.

Imaging capability of the PLV will now be described with reference to FIGS. 9A–9D. FIGS. 9A–9D illustrate a simulation of the imaging performance of a PLV according an embodiment of the present invention.

With the amplitude scattering expression of a single PLV cell given in Equation 1, it is possible to simulate the imaging capability of a PLV according to the present invention. A LabView-based program was developed for simulating PLV generated images. In this case, each bitmap pixel was assigned to a PLV cell composed of a single diffractor. As described earlier, preferred embodiments would probably use at least a 2×2 PLV cell array for a single pixel. Thus, the images shown in FIGS. 9A–9D represent a worst-case contrast scenario. This process of image simulation included of the following steps:

(a) Read in a monochrome gray-scale bitmap file;
(b) Convert gray-level to equivalent phase for the PLV cell (0–π);
(c) Program the 64×64 array of PLV modulators;
(d) Calculate forward Fourier transform (diffraction pattern);
(e) Select subset of Fourier transform (Schlieren filter);
(f) Calculate the inverse Fourier transform from the diffraction subset; and
(g) Square scattered amplitude/phase to generate intensity (image).

FIGS. 9A–9D show the results of the simulation. FIG. 9A shows the physical PLV MEMS array. This is data loaded directly from a bitmap file into the array (gray-levels flattened). FIG. 9B shows a diffraction pattern calculated from the forward Fourier transform of the MEMS array. Note the 4-fold symmetry. FIG. 9C shows a Schlieren filter used to select the 0-order light for imaging. FIG. 9D shows an image calculated from the inverse Fourier transform. Note the continuous gray-scale and borderless pixel quality produced by the PLV.

In this case, 0-order (back-reflected) light was used to generate the image. The resulting image delivers continuous gray-scale and border-less pixels (no screen-door). The slight waviness observed in FIG. 9D is merely an artifact due to the small size of the array (64×64).

Some alternative embodiments of a PLV according to the present invention will now be described.

Linked Actuators

The embodiments of the PLV described and illustrated above generally have independent actuators. An alternative design utilizes a single mobile actuator housing or including several diffractive features or elements. One such device is a "linked" actuator design in a PLV. Here, multiple diffraction features are included on a single, deflectable plate. More specifically, the linked actuator includes four aluminized diffraction features are located on a single large (~25 μm) actuator. An advantage of this design is that it is that there is more room to develop compliant flexures. Another advantage is that squeeze-film damping in this PLV device would be very efficient given the relatively large dimension of the moving actuator plate.

The linked actuators can be used with designs containing in which each pixel contains 3, 4, 5 or more holes or apertures. However, because it is difficult to achieve large diffraction angles (θ) with narrow divergence (Δθ) in low pitch structures, in a preferred embodiment the PLV has pixels with a 2×2 array holes, as shown in FIG. 8. In addition, a square 2×2 array holes allows enough room around the actuator disks to house or cover the flexures with the tent membrane. A further advantage of the smaller linked actuator with a 2×2 array holes, is the lower mobile mass of the actuator as compared with larger linked actuators having larger arrays of holes. Greater mobile mass of the actuator translates to lower resonant frequency and lower switching speed. Also, larger linked actuators present a relatively large area film that is not posted or secured at the extremities. Thus, film stresses would need to be controlled to maintain a flat film.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A diffractor for modulating light incident thereon, the diffractor comprising:
    an electrically active substrate having an upper surface;
    a tent member disposed above the upper surface of the substrate and spaced apart in relation thereto and having a first planar light reflective surface formed on an upper side of the tent member the upper side facing away from the substrate, the first planar light reflective surface having an aperture formed therein;
    a movable actuator disposed between the upper surface of the substrate and the first planar light reflective surface, the movable actuator having a second planar light reflective surface parallel to the first planar light reflective surface and positioned relative to the aperture to receive light passing therethrough; and
    a mechanism for moving the actuator relative to the first planar light reflective surface of the tent member while maintaining the second planar light reflective surface substantially parallel to the first planar light reflective surface.

2. A diffractor according to claim 1 wherein the aperture is sized and shaped to define an area with reflectivity substantially equal to a reflectivity of an area of the first planar light reflective surface surrounding the aperture.

3. A diffractor according to claim 1 wherein in a quiescent state the first planar light reflective surface and the second planar light reflective surface are separated by a distance substantially equal to $n*\lambda/4$ wavelength, where $\lambda$ is a particular wavelength of light incident on the first and second planar light reflective surfaces, and n is an integer equal to or greater than 0.

4. A diffractor according to claim 3 wherein n is an odd number equal to or greater than 1.

5. A diffractor according to claim 3 wherein n is an even number equal to or greater than 2.

6. A diffractor according to claim 1 wherein the mechanism for moving the movable actuator comprises a circuit structure configured to create an electrostatic force between the substrate and the movable actuator.

7. A diffractor according to claim 1 wherein the tent member is supported above the upper surface of the substrate by a plurality of posts extending from the upper surface of the substrate to a lower surface of the tent member.

8. A diffractor according to claim 7 wherein at least one of the plurality of posts is electrically coupled to an electrical ground in the substrate, and the tent member is electrically coupled to the electrical ground through the post.

9. A diffractor according to claim 7 wherein the tent member is not electrically coupled to an electrical ground within the substrate.

10. A diffractor according to claim 7 wherein the movable actuator is flexibly coupled between the upper surface of the substrate and the tent member by at least one flexure extending from a peripheral edge of the movable actuator to at least one of the plurality of posts.

11. A diffractor according to claim 10 wherein the at least one of the plurality of posts is electrically coupled to an electrical ground in the substrate, and wherein the movable actuator is electrically coupled to the electrical ground through the flexure and the post.

12. A diffractor according to claim 1 wherein the tent member is supported above the upper surface of the substrate by a plurality of posts extending from an actuator layer up to the tent member.

13. A diffractor according to claim 1 wherein the aperture is shaped to define a geometric figure selected from a group including of circles, rings, ellipses, and polygons.

14. A diffractor according to claim 1 wherein the movable actuator comprises a high modulus material to stiffen the movable actuator and to maintain the planarity of the second planar light reflective surface.

15. A diffractor according to claim 1 wherein the movable actuator comprises an upper portion on which the second planar light reflective surface is formed, a lower portion and a support coupling the upper and lower portions.

16. A diffractor according to claim 15 wherein the diffractor is a flat planar light valve (PLV) wherein the upper portion and the support are sized and shaped relative to the aperture to enable the mechanism so as to be able to move the actuator between a first position, wherein the second planar light reflective surface is co-planar with the first planar light reflective surface, and a second position, wherein the second planar light reflective surface is not co-planar with the first planar light reflective surface.

17. A modulator comprising a plurality of diffractors according to claim 1.

18. A modulator according to claim 17, comprising a plurality of pixels, each pixel including at least one of the plurality of diffractors.

19. A modulator according to claim 17, wherein the plurality of diffractors are integrally formed on a single substrate, and wherein the tent members of each of the plurality of diffractors are formed from a single tent membrane supported above the upper surface of the substrate by a plurality of posts extending from the upper surface of the substrate to a lower surface of the tent membrane, the tent membrane having the first planar light reflective surface and a plurality of the apertures extending therethrough.

20. A modulator according to claim 19, wherein the movable actuators of each of the plurality of diffractors are flexibly coupled between the upper surface of the substrate and the first planar light reflective surface of the tent membrane by at least one flexure extending from a peripheral edge of at least one movable actuator to at least one of the plurality of posts, and wherein each of the movable actuators is coupled to at least one other movable actuator along the peripheral edges thereof.

21. A method of modulating a beam of light, comprising the steps of:
    causing the beam of light to impinge upon a plurality of diffractors, each including a first planar light reflective surface having an aperture formed therein, and a second planar light reflective surface parallel to the first planar light reflective surface and positioned relative to the aperture to receive light passing therethrough; and
    moving the second planar light reflective surface relative to the first planar light reflective surface while maintaining the second planar light reflective surface substantially parallel to the first planar light reflective surface,
    whereby a portion of the incident beam of light impinging upon a particular diffractor is diffracted when the first and second light reflective surfaces of the diffractor are separated by an odd multiple of a quarter wavelength and is reflected when the first and second light reflective surfaces of the diffractor are separated by an even multiple of a quarter wavelength.

22. A method of manufacturing a modulator for modulating a beam of light, comprising the steps of:

providing a substrate;

depositing a first sacrificial layer onto the substrate;

forming a first plurality of holes extending through the first sacrificial layer and terminating onto the substrate;

depositing an actuator layer onto the first sacrificial layer, the material of the actuator layer substantially filling the plurality of holes to form a first plurality of posts;

patterning the actuator layer to form a plurality of actuators and a plurality of flexures coupling the actuators to the first plurality of posts;

depositing a second sacrificial layer onto the patterned actuator layer;

forming a second plurality of holes extending through the second sacrificial layer and terminating onto the first plurality of posts;

depositing a tent layer onto the second sacrificial layer;

patterning the tent layer to form a tent member having a plurality of apertures therein, each of the plurality of apertures located in the tent member to align with one of the plurality of actuators; and removing the first and second sacrificial layers to release the plurality of actuators and the plurality of flexures, whereby the tent member is supported by the second plurality of posts above the substrate, and the plurality of actuators are flexibly coupled by the plurality flexures to the first plurality of posts between the tent member and the substrate.

23. A method according to claim 22 comprising the further step of depositing a metal over the modulator to provide a first reflective surface on the tent member and a second reflective surface on each of the plurality of actuators parallel to the first planar light reflective surface and positioned relative to one of the plurality of apertures to receive light passing therethrough, wherein the tent member functions as a mask to enable the metal to be deposited on the actuator substantially without depositing metal on the plurality flexures.

* * * * *